S. ILLINGWORTH.
AUTOMOBILE SIGNAL.
APPLICATION FILED JULY 9, 1917.

1,282,694.

Patented Oct. 22, 1918.
2 SHEETS—SHEET 1.

WITNESSES
E. H. Deesen Jr.
D. B. Phillips.

INVENTOR
S. Illingworth,
BY Victor J. Evans
ATTORNEY

S. ILLINGWORTH.
AUTOMOBILE SIGNAL.
APPLICATION FILED JULY 9, 1917.

1,282,694.

Patented Oct. 22, 1918.
2 SHEETS—SHEET 2.

WITNESSES
EC Sdeser Jr.
D. B. Phillips

INVENTOR
S. Illingworth,
BY Victor J. Evans
ATTORNEY

UNITED STATES PATENT OFFICE.

SAM ILLINGWORTH, OF DALLAS, TEXAS.

AUTOMOBILE-SIGNAL.

1,282,694.	Specification of Letters Patent.	Patented Oct. 22, 1918.

Application filed July 9, 1917. Serial No. 179,459.

*To all whom it may concern:*

Be it known that I, SAM ILLINGWORTH, a citizen of the United States, residing at Dallas, in the county of Dallas and State of Texas, have invented new and useful Improvements in Automobile-Signals, of which the following is a specification.

This invention relates to improvements in vehicle signals, and has particular reference to a device for indicating proposed movements of an automobile.

The principal purpose of the invention is to furnish an improved means for actuating the indicator of the device. It is further proposed to combine in a greater degree the features of simplicity, compactness, and reliability of operation; and to adapt the indicator for more effectively attracting attention at night.

To attain the above-mentioned ends and others which will hereinafter appear, I have incorporated the invention in the preferred form described in the specification and claims and shown in the drawings.

In the drawings—

Figure 1:
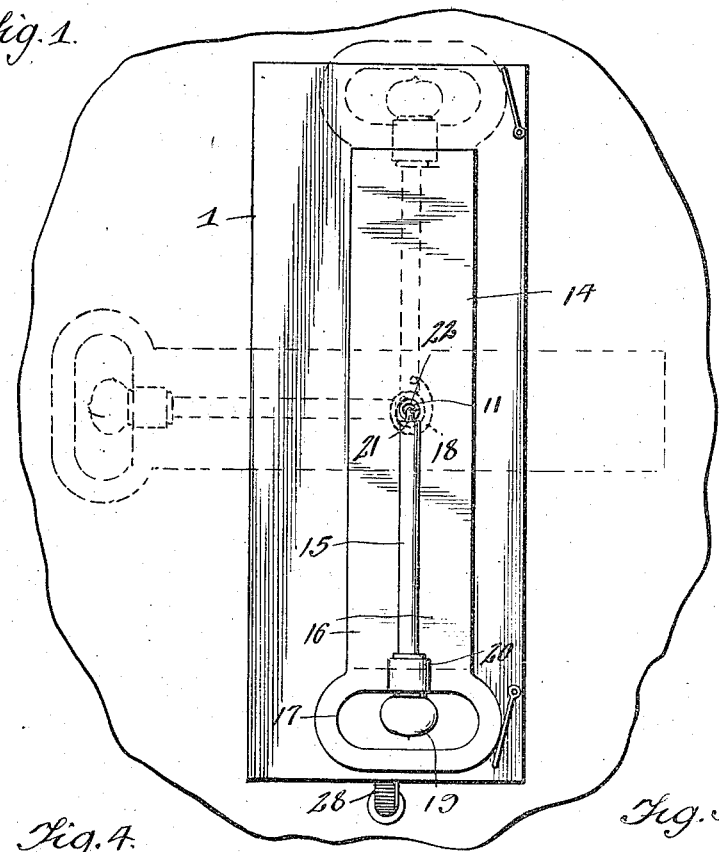
Figure 1 is a rear elevation of an automobile with the indicator comprised in the present invention applied thereto.
Figure 4:
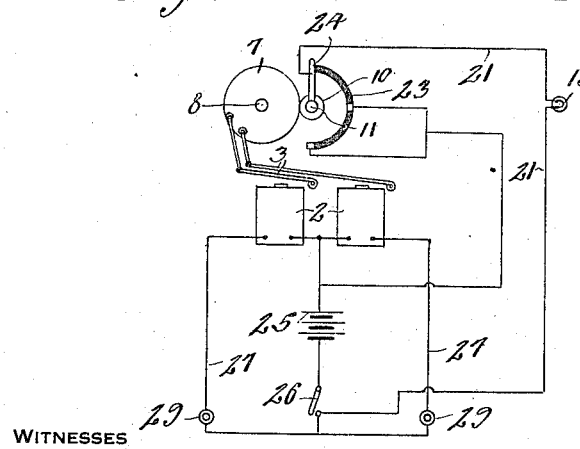
Fig. 4 shows the various parts of the mechanism and the electrical circuits diagrammatically.
Figure 5:
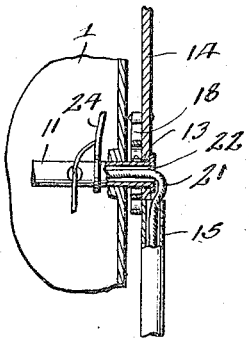
Fig. 5 illustrates details of the invention.
Figure 2:
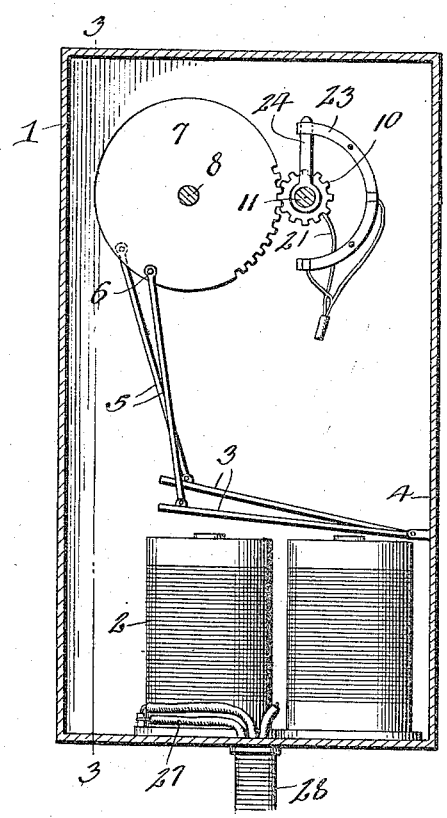
Fig. 2 is a vertical section through the housing containing the actuating mechanism.
Figure 3:
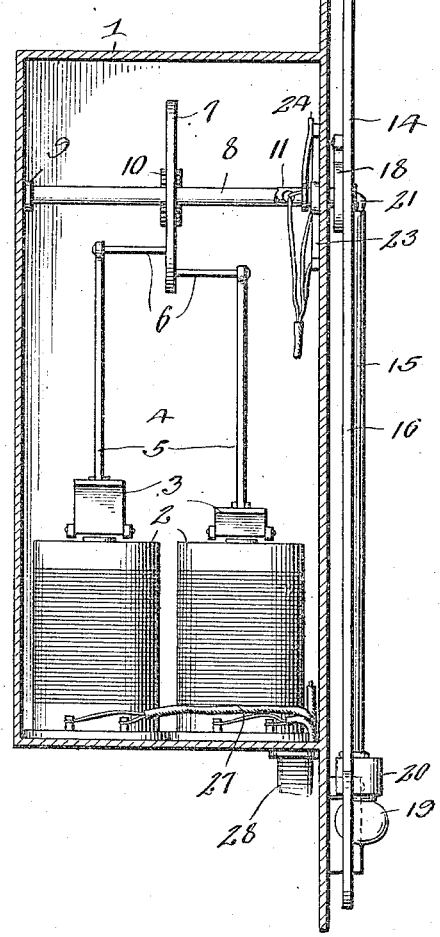
Fig. 3 is a vertical section on the line 3—3 of Fig. 2.

In the drawings, the numeral 1 designates a housing of convenient form and suitable material for containing the mechanism whereby the signal arm is actuated. As here shown the actuating mechanism comprises a pair of magnets 2 positioned on the bottom of the housing for attraction of respective armatures 3 having one end on the wall 4 of the housing 1 for swinging movement toward and away from the magnets 2. Each armature 3 has pivotally attached toward the free end a link 5 extending upwardly for similar pivotal connection at the other extremity to a pin 6 projecting laterally from an outer portion of a gear wheel 7 mounted on a shaft 8 suitably journaled in bearings 9 attached to the walls of the housing 1. The gear wheel 7 meshes with a preferably smaller gear wheel 10 mounted on a shaft 11 journaled in bearings affixed to the wall of the housing, and prolonged through an opening 13 in the front wall for terminal connection to the signal arm or indicator 14 which has one end somewhat heavier than the other, whereby it is normally maintained in a vertical position. The indicator 14 is preferably constructed in the manner shown of sheet metal to form a conduit 15 provided on either side with a web 16 extended at the ends and formed adjacent the outer end of the conduit with an opening 17; and is of such configuration and so colored as to readily attract attention. In the preferred form of the invention the indicator is loosely mounted upon the shaft 13 but adapted to be rotated thereby through the medium of a spiral spring 18 having one end secured to the shaft and the other end to the indicator. By the latter arrangement the armatures 3 are permitted movement to a position for more powerful attraction by the magnets 2 before overcoming the inertia of the arm, whereby the speed of action is increased; further, the destructive action upon the apparatus otherwise resulting from jolting of the vehicle with the arm in the operative positions is avoided. The indicator is formed with one end somewhat heavier than the other, whereby it is normally maintained in a vertical position. The pins 6 are suitably positioned on the gear 7, and the ratio of the gear 7 to the gear 10 is such, that in the actuation of one armature the indicator 14 will be rotated to a horizontal position, while in the actuation of the other armature the indicator will be rotated to a reversed vertical position. To insure a quick and certain return from the latter position, a spring is suitably disposed on the housing for contact with the indicator toward the end of the movement to the vertical position.

For effective operation of the device at night an electric lamp 19, preferably red, is secured within the opening 18 by a socket 20 in the outer end of the conduit 15 and is suitably connected to conductors 21 here shown as extending through the conduit, and a bore 22 terminating in a lateral opening provided in the shaft, into the housing 1. An arcuate contact plate 23 is secured to the housing concentrically to the shaft 13.

Mounted on the shaft 13 for sliding contact with the plate 23 in the movement of the indicator is an insulated contact arm normally disconnected from the plate 23 but adapted to establish connection therewith in commencing a movement toward either operative position and to maintain such connection until the return to the normal position. The arm 24 is connected to one of the conductors 21, and the other conductor 21 and the plate 23 are connected to respective terminals of convenient source of electricity 25, with the usual switch 26 inserted in the circuit. Each magnet 2 is similarly connected by conductors 27 which may be inclosed in a conduit 28 opening into the housing 1 with the source of electricity 25 and a push button or other suitable switch 29 located for convenient operation by the driver of the vehicle.

The herein described embodiment of the invention is not to be construed as limiting the spirit or scope of the invention, as I reserve the right to changes, alterations, and the use of equivalents within the latitude defined by the claims.

What I claim is:—

1. A signal device comprising a casing, a shaft journaled therein, an indicator arm on said shaft, a toothed wheel on said shaft, a second shaft journaled in the casing, a toothed wheel thereon meshing with the wheel on the other shaft, electromagnets in said casing, a pair of armatures hinged to one side of the casing and arranged to be actuated by the magnets, and a rod connecting each armature to the toothed wheel on the second shaft, the points of attachment of said rods with the wheel being arranged one above the other.

2. A signal device comprising a casing, electromagnets located therein, a pair of armatures hinged to one side of the casing and adapted to be acted upon by said magnets, a shaft journaled in the casing, a toothed wheel on said shaft, a pin projecting from each side of said wheel and one of said pins being arranged above the other, rods connecting said pins with the armatures, an indicating arm, and means for operating the same from said toothed wheel.

In testimony whereof I affix my signature.

SAM ILLINGWORTH.